Aug. 12, 1958 H. W. BAKER 2,846,819
APPARATUS FOR MANUFACTURING TOUGHENED BENT GLASS
Filed Sept. 15, 1953 3 Sheets-Sheet 1
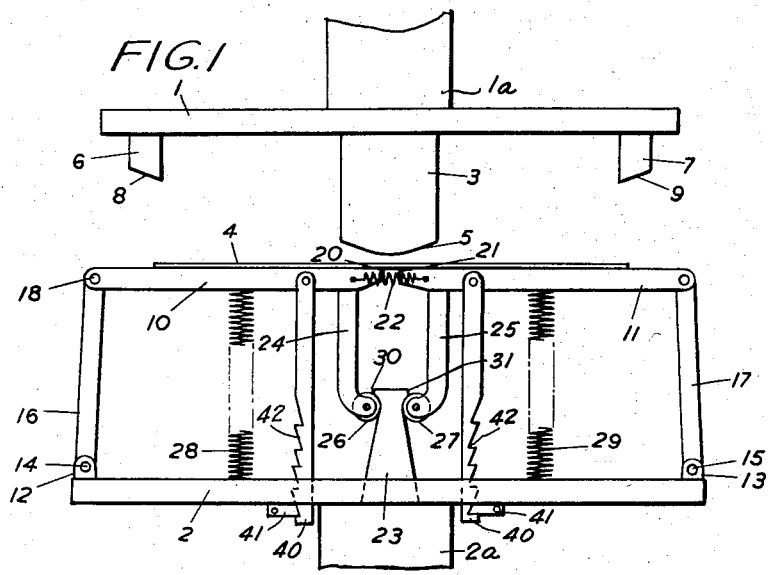
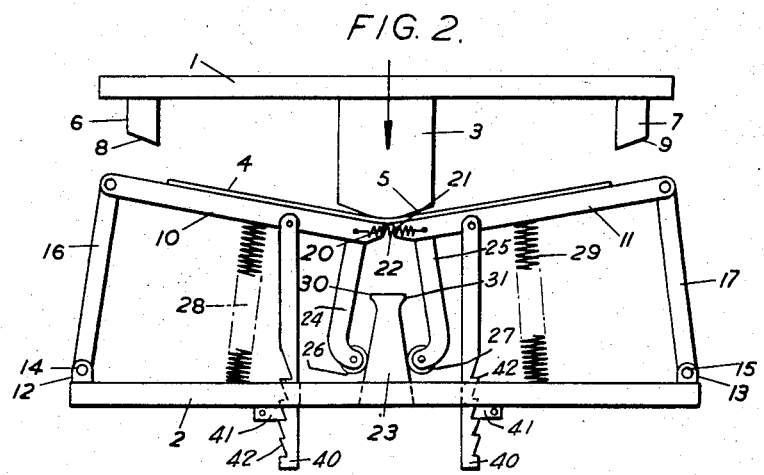
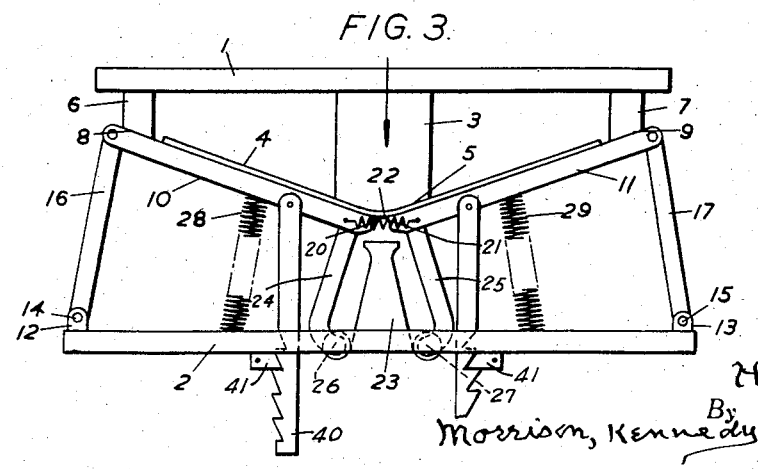
Inventor:
H. W. Baker
By Morrison, Kennedy + Campbell
Attorneys.

Aug. 12, 1958           H. W. BAKER           2,846,819
APPARATUS FOR MANUFACTURING TOUGHENED BENT GLASS
Filed Sept. 15, 1953           3 Sheets-Sheet 2
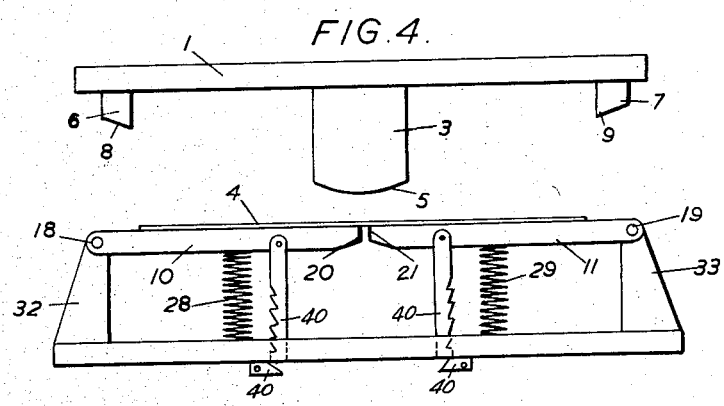
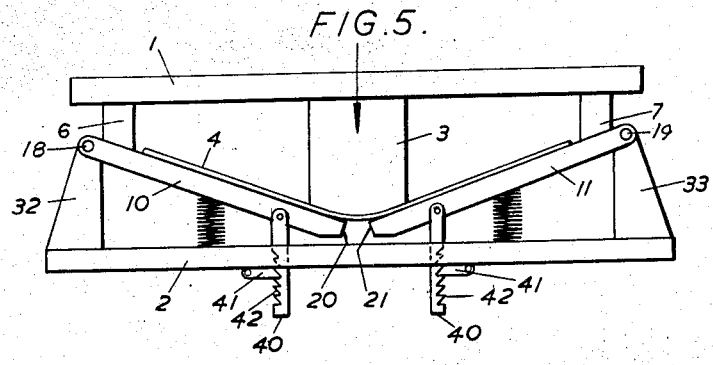
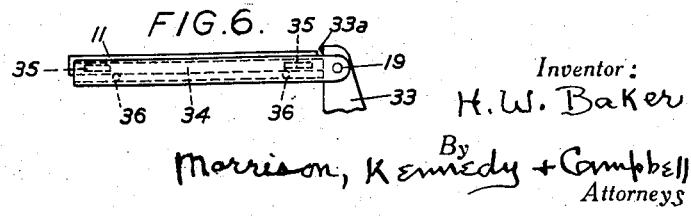
Inventor:
H. W. Baker
By
Morrison, Kennedy + Campbell
Attorneys

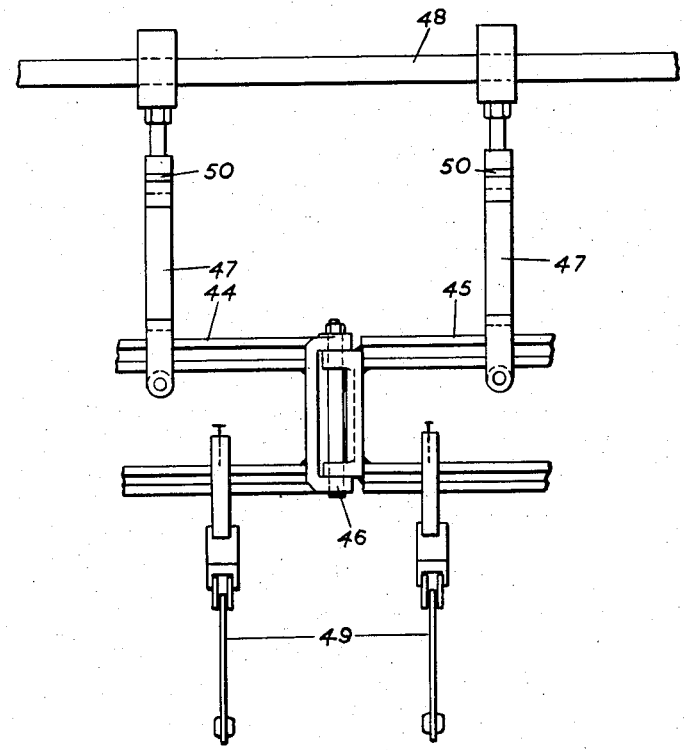

United States Patent Office 2,846,819
Patented Aug. 12, 1958

2,846,819

APPARATUS FOR MANUFACTURING TOUGHENED BENT GLASS

Henry W. Baker, Birmingham, England, assignor to Pilkington Brothers Limited, Liverpool, England, a corporation of Great Britain Application September 15, 1953, Serial No. 380,208

Claims priority, application Great Britain September 29, 1952

8 Claims. (Cl. 49—67)

This invention relates to an apparatus for manufacturing toughened bent glass.

The manufacture of toughened flat glass involves two distinct stages of treatment, that is to say:

(a) The glass is heated up to near its softening point and on removal from the furnace it is disposed in a position at which toughening is effected.

(b) The glass is immediately subjected on each side simultaneously to quenching jets which rapidly effect surface chilling.

In the manufacture of toughened glass bent from flat glass, the glass is first heated up to near its softening point and while at that elevated temperature is bent to the desired curvature, and when the bending treatment has been effected the bent glass is subjected as quickly as possible to rapid chilling to effect the toughening of the bent glass.

One of the following methods of bending flat glass preparatory to toughening is usually employed in industry:

(1) The glass is suspended in the furnace by tongs from an overhead conveyor, in which furnace the glass is heated up to near its softening point, and is conveyed by the suspending means from the furnace to a position where the heated glass is disposed between complementary forming members, which have matching profiles. The complementary members are simultaneously actuated to approach and move away from one another. During the approach the suspended heated glass is progressively clamped between the complemental members, and when they have been retracted from the glass at the end of a bending operation the glass is toughened by chilling. This method of carrying the glass for bending is hereinafter referred to as vertical suspension, and an example of this is disclosed in U. K. patent specification No. 423,566.

(2) The flat glass to be bent is disposed in a horizontal plane across a hollow support and moved into a furnace, where the glass, by reason of the heat imparted, sags into the support and is thereby given the desired bend. When the bend is completed the glass is brought out of the furnace and is immediately toughened by chilling whilst still on the hollow support. This method of bending is usually referred to as horizontal bending, an example of which is disclosed in U. K. patent specification No. 641,777.

Many attempts have been made in the past to produce a V-shaped bend, a main objective of these attempts being to produce a windscreen in one piece for motor vehicles, but the experiments which have been conducted show that during the formation of the angle of the V the whole of the glass is bent, and that the final part of the operation of bending, involving a flattening out of the glass to each side of the angle in the V, does not in fact produce a flatness comparable with the pristine flatness of the glass, and moreover if solid complementary members are employed in an operation attempting to restore the pristine flatness the glass is marred.

It is obviously desirable that vision through a windscreen, when made in one piece and of V shape, shall be as nearly perfect as possible, and the main object of the present invention is to devise an apparatus for manufacturing V-shaped glass in which the pristine flatness of the glass is retained at each side of the angle, and another main object is to produce a single piece V-shaped windscreen for road vehicles, having optimum optical properties from the middle to each side of the screen.

In accordance with the present invention, in order to produce a V-shaped bend in flat glass preparatory to toughening, the hot glass suspended vertically is caused to wrap itself about a forming member having a shape to impart the angle bend to the glass, while the flat glass to each side of the bend by yielding plane members, whereby the bend is continually supported at the angle of the V is formed and the pristine flatness of the remainder of the glass is maintained throughout the bending operation.

Apparatus for effecting vertical bending in accordance with the present invention comprises two co-operating members, one of which carries a vertical post about which flat glass to be bent is wrapped during bending, whilst the other co-operating member constitutes a support for the unbent glass, the said other member including two initially co-planar plates hinged on vertical axes disposed at points beyond the ends of the curved portion required in the glass, said plates being resiliently supported so as to constitute yielding supports for the flat portions of the glass to each side of the V movable as the angle in the bend is formed by the said post, and means for causing relative movement between the co-operating members whereby flat glass is given a V bend. The post may be slightly longer or slightly shorter than the height of the glass. The radius of the bend formed is somewhat greater than that of the profile of the post, and a suitable profile must be determined experimentally.

In apparatus according to the invention each of the coplanar plates may be hinged on a vertical axis to a rigid horizontal link hinged to a base for the respective co-operating member, the plates being spring urged into coplanar position, the links being at an angle to the base of approximately a right angle when the plates are coplanar, and the base carrying a cam bar disposed symmetrically of the juxtaposed ends of the plates, said cam bar being of tapered cross-section in plan view, the cam bar being narrower at the free end than at the base, the juxtaposed ends of the plates being connected by a tension spring and each having an arm carrying a roller disposed to ride on the respective tapered faces of the cam bar, the arrangement being such that, as the plates yield, the rollers ride on the tapered faces under the action of the tension spring and the links rock inwardly so as to eliminate relative movement between the flat glass areas and the supporting plates during the formation of the bend.

In an alternative construction according to the invention the coplanar plates may each be hinged on a vertical axis to an arm fixed to the base for the respective co-operating member. In such construction the coplanar plates may be constituted as slidable members each mounted on a frame hinged about a vertical axis to the said arm, the frames and plates being urged forward into coplanar position by springs, and stops being provided to locate the plates in the coplanar position.

The frames may be provided with runways on which run those edges of the plates which are at right angles to the hinge axis, antifriction means, for example rollers, being mounted in the runways, and in a modified form antifriction means may be located on the frame to engage the backs of the plates in the top and bottom marginal areas. By such forms of construction the plates are capable of freely moving with the flat portions of the glass, and relative movement between the flat glass and its supports during the formation of the V bend is avoided.

Constructions according to the invention are provided with mechanical means for holding the supporting plates in fully yielded position against immediate return under the action of their respective springs, after the bend is effected, to facilitate releasing the glass for toughening.

The plates may be provided with arms which project through slots in the respective base, such arms having recesses or slots and the base carrying catches which normally ride on the arms but engage in the recesses or slots after the bend is effected.

In the operation of bending glass to V shape in accordance with the invention the supporting plates yield as the forming post is advanced so that the glass is bent by wrapping itself around the post, whilst the flat glass to each side of the bend is engaged only by the supporting plates which prevent bending of the flat portions of the glass as they are engaged by them.

In order that the invention may be more clearly understood some preferred embodiments thereof will now be described by way of example with reference to the accompanying diagrammatical drawings, said embodiments being constructed to produce a windscreen in one piece for motor vehicles, that is to say, a single piece of glass having a V bend in which the angle at the V is wide and the lengths of the flat portions to each side of the V are equal.

Fig. 1 is a plan view of one embodiment of bending apparatus with flat glass in position ready for bending.

Fig. 2 is a view similar to Fig. 1 showing the development of the bend in the glass, with the side portions of the latter remaining flat against the initially coplanar plates.

Fig. 3 is a view similar to Figs. 1 and 2 showing the bend in the glass fully developed.

Fig. 4 is a plan view similar to Fig. 1 of a further embodiment of apparatus with glass in position prior to bending.

Fig. 5 is a plan view of the apparatus of Fig. 4 but shown in final bending position.

Fig. 6 is a detail view of part of the apparatus of Fig. 4, and

Fig. 7 is a front view showing a part of the means for suspending the glass during the bending operation.

In the embodiment according to Figs. 1 to 3 each of two co-operating members is mounted on an hydraulically operated ram indicated at 1a and 2a in Fig. 1, these members comprising a vertical base 1 and a vertical base 2 respectively, each base being rigidly secured to its respective horizontally disposed ram, the rams of the two cooperating members being coaxial. The base of co-operating member 1 has a central post 3 disposed perpendicular to the base, the post having a length which is slightly less than the height of the flat glass 4 to be bent. The post is bolted to the base member and has a profile at the free face 5 which corresponds to the internal curvature of the angle to be formed in the glass, although the radius of the bend formed will normally be somewhat greater than that of the profile of the post.

On the base to which the post is bolted there are mounted two horizontal abutments 6 and 7 at points beyond the ends of the glass 4 to be bent and preferably at equal distances from the central post 3, each of these abutments having its end face 8 and 9 respectively, of such profile that a profile template, which has the form of the outer or convex face of the glass after bending, when placed against the end faces of the abutments is spaced from the face 5 of the post by a distance equal to the thickness of the glass, see Figure 3. Supporting plates 10 and 11 for the glass are provided on the base 2, and these supporting plates may be extended beyond the ends of the glass to provide surfaces against which the abutments 6 and 7 bear, which surfaces are coplanar with the outer surface of the glass before bending.

The base 2 carries bearings 12 and 13 for vertical hinge pins 14 and 15, by which rigid horizontal links 16 and 17 are mounted on the base 2 and adapted to swing towards each other across the base from an initial position in which they are nearly perpendicular to the base, as shown in Fig. 1. The free ends of the horizontal links are provided with vertical hinge pins 18 and 19, by which the supporting plates 10 and 11 for the glass are carried.

The length of the supporting plates, from their hinges, is such that the adjacent edges 20 and 21 of the plates, when coplanar, about opposite the centre of the post.

The juxtaposed ends of the supporting plates may be connected by tension springs 22 to limit the separation of these supporting plates in a bending operation.

To the base 2 carrying the supporting plates is fixed a vertical cam bar 23, which is disposed at right angles to the base and immediately opposite the post 3, and is narrower at its free end than at its base. Rigid arms 24 and 25 project from the juxtaposed ends of the supporting plates 10 and 11 and ride on the inclined faces of the cam bar 23, the arms 24, 25 being provided with rollers or ball bearings 26 and 27 respectively to facilitate the running of the arms on the cam bar. This cam arrangement in conjunction with the pivotal supports for the supporting plates 10 and 11 cause said plates to move so that there is no relative movement between said supports and the glass to be bent.

The supporting plates are engaged on the outside by compression springs 28 and 29 mounted on the base 2 and disposed substantially mid-way between the free ends of the plates and their hinges 18, 19.

As the post 3 engages the middle area of a sheet of hot flat glass vertically disposed against the supporting plates in their coplanar position by suspending means of known kind (not shown) used to carry the glass from a furnace to the co-operating members 1 and 2, the supporting plates yield at the middle of the apparatus as the two bases 1, 2 approach one another and the post is advanced through the plane of the hinges 18, 19, during this movement the links 16 and 17, on which the plates are hinged, are pulled inwardly by the action of the supporting tension springs 22 which cause the arms 24 and 25 carried by the plates to ride on the inclined faces of the cam bar 23 as the supporting plates hinge apart. The inclination of the faces of the cam bar is such that the supporting plates move in unison with the flat portions of the glass under the guidance of the cam bar to each side of the bend as the bend is formed and the supporting plates continuously support the glass whilst retiring from coplanar position, whereby there is no relative movement between the glass and the supporting plates. Hence not only is the flat pristine condition of the glass to each side of the bend maintained during the bending operation, but there is no marring of the glass by relative movement between the glass and the hinged supporting plates.

The cam bar 23 carrying the inclined faces may carry horns 30 and 31 at its extremity, which act as stops for the arms 24 and 25 on the supporting plates, whereby the supporting plates are automatically disposed by the springs 28 and 29 in their initial coplanar position as shown in Figure 1 when the co-operating members are retracted apart prior to a bending operation. The limit of movement of the member carrying the post in the construction just described is determined by the abutment members 6 and 7 engaging the supporting plates 10, 11 near their hinges 18, 19. Alternatively the bar may have adjustable abutments (not shown) at each side thereof to limit the backward movement of the arms 24 and 25 carried by the supporting plates at the completion of the bending.

In order to hold the yielding supporting plates 10 and 11 in the position they attain at the end of a bending operation, the juxtaposed ends of the plates have horizontal ratchet arms 40 hinged thereto and projecting through an opening in the base 2. Spring-pressed catches 41 pivotally secured to the base 2 engage the teeth edges of the arms 40 idly when said arms are moving in one direction as a result of the glass bending movement of the supporting plates 10 and 11 but fall into the notches 42 along said edge to lock the arms to the base 2 against movement in the opposite direction. This holds the supporting plates 10 and 11 in retracted position, so that the bent glass can be moved for toughening operation immediately after the cooperating members carried on the bases 1 and 2 respectively have moved apart sufficiently to release the glass. To reset the supporting plates 10 and 11 to coplanar position, the catches 41 are moved to release the arms 40. This allows the required movement of the plates 10 and 11 under the action of their springs 28 and 29.

Fig. 4 shows an embodiment of the invention, in which the supporting plates 10 and 11 are mounted by means of hinge pins 18 and 19 on arms 32 and 33, which are secured rigidly to the base 2 and take the place of the links 16 and 17 in the embodiment according to Figs. 1 to 3.

However, in this embodiment relative movement between the supporting plates and the glass is avoided by the construction illustrated in Fig. 6. In this case the supporting plates, of which the plate 11 is shown in Fig. 6, are constructed as slidable members each mounted on a frame 34 hinged as at 19 to the rigid arm 33, as is for example the plate 11 in Fig. 4. The frames are provided with runways, for example recesses or channels, in which run, on roller or ball bearings 35, those edges of the plates which are at right angles to the axis of the hinge 19. Antifriction means are located on the frame as at 36 to engage the backs of the plates at the top and bottom areas thereof. Stops at 33a may locate the frames against the arm 33 in the coplanar position.

Constructions according to the present invention and as herein described provide a means of forming a V-shaped bend from flat glass in which the pristine flatness of the glass is maintained to each side of the bend throughout the bending operation, and it will be clear that the invention is applicable not only to the manufacture of symmetrical windscreens for motor vehicles, but to the production of glass with a V bend in which the extent of the flat part on one side of the bend is greater than the extent of the flat part on the other side of the bend. Moreover by reason of the absence of relative movement between the glass and the supporting plates during the bending operation the original optical qualities of the glass are fully maintained.

The tongs for suspending the glass may be, for example of the kind shown in Fig. 7. This figure illustrates a sectionalised tong bar comprising upright links 44 and 45 hinged together at 46 and depending by way of suspension means, as at 47, from a rigid bar 48, along which the suspension means are adapted to run for the purpose of moving the glass carried by the tongs 49 into and out of the position for bending. Owing to the hinged connection at 46 the links 44 and 45 are enabled to turn individually about swivels 50, so that the tongs 49 and readily adapt themselves to the position of the glass when bent.

We claim:

1. Apparatus for imparting a V shape to vertically suspended flat glass, which has been heated up to near its softening point, comprising two co-operating members, one of which includes a vertical post about which the vertically suspended flat glass to be bent is wrapped during bending, whilst the other co-operating member includes a vertical base and two plates hinged on vertical axes disposed at points beyond the ends of the curved portion required in the glass, means for initially setting said plates into coplanar position, said plates being resiliently supported on said base so as to constitute yielding supports for the flat portions of the glass each side of the V movable as the angle in the bend is formed by the said post, means for causing relative movement between the co-operating members whereby flat glass is given a V bend, means supporting and guiding said plates for movement with the respective flat portions of the glass in contact therewith to prevent relative movement between the flat portions of the glass and the respective plates during the bending operation, and holding means for the plates operatively associated with the respective base and adapted to hold the plates in fully yielded position during retraction of the vertical post, thereby immediately releasing the suspended glass to cause the glass to hang free of the plates for immediate transfer to a toughening station.

2. Apparatus for imparting a V shape to vertically suspended flat glass according to claim 1, wherein the means supporting and guiding said plates include a pair of rigid horizontal links hinged to the base and hinged by vertical axes to the respective plates, the links being at an angle to the base of approximately a right angle when the plates are coplanar, a cam bar on the base end disposed symmetrically of the juxtaposed ends of the plates, said cam bar being of tapered cross-section in plan view, the cam bar being narrower at the free end than at the base, an arm carried by each plate, and a roller carried on each arm and disposed to ride on the respective tapered face of the cam bar, and wherein the means for initially setting said plates into coplanar position comprises a tension spring connecting the juxtaposed ends of the plates, the arrangement being such that, as the plates yield, the arms ride on the tapered faces under the action of the tension spring and the links rock inwardly so as to eliminate relative movement between the flat glass areas and the supporting plates during the formation of the bend.

3. Apparatus for imparting a V shape to vertically suspended flat glass according to claim 1, wherein the means supporting and guiding said plates include a pair of arms affixed to the base, and means hinging each of said plates by a vertical axis to a respective arm.

4. Apparatus for imparting a V shape to vertically suspended flat glass according to claim 3, wherein the means supporting and guiding said plates include a frame for each plate hinged about a vertical axis to the respective arm, each plate being supported and guided on its respective frame for slide movement therealong, and wherein the means for initially setting said plates into conplanar position comprises a tension spring acting on said frames and stops provided to locate the plates in coplanar position.

5. Apparatus for imparting a V shape to vertically suspended flat glass according to claim 3, wherein the means supporting and guiding said plates include a frame for each plate hinged about a vertical axis to the respective arm, each of said plates being supported on its respective frame with the edge of the plate at right angles to its respective hinge axis, each of said frames having a runway and antifriction bearings in said runway, the said edge of each plate being mounted in the runway of the respective frame and being supported on the antifriction bearings in the latter runway.

6. Apparatus for imparting a V shape to vertically suspended flat glass according to claim 1, wherein said holding means comprises arms on said plates respectively having ratchet recesses thereon, said base having slots through which said arms project respectively, and catches carried by said base and normally riding the recess edges of said arms respectively during bending operations, but releasably locking into said recesses to prevent return movement of the arms.

7. An apparatus for imparting a V shape to flat glass which has been heated up to near its softening point, comprising a pair of opposed cooperative members relatively movable towards and away from each other, one of said members including a bend forming member with a convex profile at its free face for contact with the inner face of the glass corresponding to the internal curvature of the bend to be formed in the glass and wide enough to contact the glass only along its intermediate section in the region of the bend to be formed, the other member including two plates presenting respective flat supporting surfaces for the outer faces of the glass on opposite sides of the region of the bend to be formed, means supporting said plates in initial positions with their supporting surfaces in the same plane and for movements from said initial positions in directions to yield under the pressing action of the forming member, while maintaining the side sections of the glass flat against said supporting surfaces, whereby the bend in the intermediate section of the glass is formed and the pristine flatness of the remainder of the glass is maintained throughout the bending operation, and means guiding said plates for movement with the flat sides of the glass in contact therewith, to prevent relative movement between the flat sides of the glass and said supporting surfaces and to prevent thereby marring of the outer flat faces of the glass during bending operation, the means supporting said plates comprising a pair of links mounted on fixed axes at one end and pivotally connected at their other ends to the plates respectively, and the means guiding said plates for movement with the outer sides of the glass in contact therewith comprising a fixed cam, and a pair of cam followers secured to said plates for movement therewith and engaging said cam to ride thereover during the bending operation.

8. An apparatus for imparting a V shape to flat glass which has been heated up to near its softening point, comprising a pair of opposed cooperative members relatively movable towards and away from each other, one of said members including a bend forming member with a convex profile at its free face for contact with the inner face of the glass corresponding to the internal curvature of the bend to be formed in the glass and wide enough to contact the glass only along its intermediate section in the region of the bend to be formed, the other member including two plates presenting respective flat supporting surfaces for the outer faces of the glass on opposite sides of the region of the bend to be formed, means supporting said plates in initial positions with their supporting surfaces in the same plane and for movements from said initial positions in directions to yield under the pressing action of the forming member, while maintaining the side sections of the glass flat against said supporting surfaces, whereby the bend in the intermediate section of the glass is formed and the pristine flatness of the remainder of the glass is maintained throughout the bending operation, and means guiding said plates for movement with the flat sides of the glass in contact therewith, to prevent relative movement between the flat sides of the glass and said supporting surfaces and to prevent thereby marring of the outer flat faces of the glass during bending operation, the means supporting said plates comprising a pair of fixed rigid arms, and frames hinged to said arms on fixed axes, said plates being supported on said frames for angular movement therewith about said axes, and the means guiding said plates for movement with the outer sides of the glass in contact therewith comprising runways on said frames and antifriction bearings in said runways supporting said plates for guided edgewise movement during bending operation.

References Cited in the file of this patent

UNITED STATES PATENTS

| 952,052 | Steele | Mar. 15, 1910 |
| 1,258,892 | Griffin | Mar. 12, 1918 |
| 1,280,991 | Hamilton | Oct. 8, 1918 |
| 1,787,460 | Wilcox | Jan. 6, 1931 |
| 2,251,159 | Owen | July 29, 1941 |
| 2,372,418 | Forbes et al. | Mar. 27, 1945 |
| 2,431,353 | Varner et al. | Nov. 25, 1947 |
| 2,446,824 | Green | Aug. 10, 1948 |
| 2,456,675 | Chaille | Dec. 21, 1948 |
| 2,518,918 | Mauge | Aug. 15, 1950 |

FOREIGN PATENTS

| 115,961 | Germany | Sept. 16, 1899 |
| 568,088 | Great Britain | Mar. 16, 1945 |

UNITED STATES PATENT OFFICE
CERTIFICATE OF CORRECTION

Patent No. 2,846,819                                    August 12, 1958

Henry W. Baker

It is hereby certified that error appears in the printed specification of the above numbered patent requiring correction and that the said Letters Patent should read as corrected below.

Column 2, line 19, strike out "is continually supported" and insert the same after "bend" in line 18, same column; column 4, line 45, before "during" insert -- and --; column 6, line 6, before "each" insert -- on --; line 28, for "end" read -- and --; line 54, for "conplanar" read -- coplanar --.

Signed and sealed this 25th day of November 1958.

(SEAL)
Attest:

KARL H. AXLINE                                                     ROBERT C. WATSON
Attesting Officer                                           Commissioner of Patents